United States Patent
Golgiri et al.

(10) Patent No.: US 12,391,078 B2
(45) Date of Patent: Aug. 19, 2025

(54) SYSTEM AND METHOD FOR REMOTE VEHICLE CONTROL AND PEDESTRIAN USER COACHING

(71) Applicant: Ford Global Technologies, LLC, Dearborn, MI (US)

(72) Inventors: Hamid M. Golgiri, Livonia, MI (US); Erick Michael Lavoie, Van Buren Charter Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1226 days.

(21) Appl. No.: 17/102,915

(22) Filed: Nov. 24, 2020

(65) Prior Publication Data

US 2022/0161616 A1 May 26, 2022

(51) Int. Cl.
*B60D 1/36* (2006.01)
*G05D 1/00* (2006.01)

(52) U.S. Cl.
CPC ............. *B60D 1/36* (2013.01); *G05D 1/0038* (2013.01); *G05D 1/0044* (2013.01); *G05D 1/0214* (2013.01); *G05D 1/0246* (2013.01)

(58) Field of Classification Search
CPC ...... B60D 1/36; G05D 1/0246; G05D 1/0214; G05D 1/0038; G05D 1/0044
See application file for complete search history.

(56) References Cited

U.S. PATENT DOCUMENTS

| | | | |
|---|---|---|---|
| 9,102,271 B2 | 8/2015 | Trombley et al. | |
| 9,610,943 B2 | 4/2017 | Lavoie et al. | |
| 10,266,023 B2 | 4/2019 | Mattern et al. | |
| 10,308,243 B2 | 6/2019 | Lavoie | |
| 10,384,605 B1 * | 8/2019 | Golgiri | B60Q 9/008 |
| 2018/0147900 A1 * | 5/2018 | Shank | G06V 10/245 |
| 2018/0312022 A1 * | 11/2018 | Mattern | B60W 30/18036 |
| 2018/0361929 A1 * | 12/2018 | Zhang | B60D 1/366 |
| 2019/0064831 A1 * | 2/2019 | Gali | B60W 30/18036 |
| 2019/0092317 A1 * | 3/2019 | Bonander | B62D 15/0285 |
| 2019/0100246 A1 * | 4/2019 | Pilutti | B60R 1/003 |
| 2020/0070721 A1 * | 3/2020 | Golgiri | B60T 7/22 |
| 2020/0257317 A1 * | 8/2020 | Musk | G05D 1/0033 |
| 2021/0086758 A1 * | 3/2021 | Yamanaka | G08G 1/144 |
| 2022/0161783 A1 | 5/2022 | Golgiri et al. | |

* cited by examiner

*Primary Examiner* — Andrea C Leggett
(74) *Attorney, Agent, or Firm* — Frank Lollo; Price Heneveld LLP

(57) ABSTRACT

A vehicle control system includes at least one detection device configured to capture detection data. The system further includes a controller that identifies a travel path of the vehicle extending from a current position to a target position of the vehicle. In response to the travel path, the controller calculates a travel zone occupied by the vehicle traversing the travel path and determines at least one viewing zone proximate to the travel zone. The controller further determines a location of a user based on the detection data and controls a navigation routine of the vehicle along the travel path in response to a location of the user relative to the at least one viewing zone.

14 Claims, 10 Drawing Sheets

SYSTEM AND METHOD FOR REMOTE VEHICLE CONTROL AND PEDESTRIAN USER COACHING

FIELD OF THE INVENTION

The present disclosure generally relates to a system for assisting in a vehicle-trailer hitching operation. In particular, the present disclosure relates to a system for monitoring or controlling an alignment between a vehicle and a coupler of a trailer with a remote device.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause undesired contact between the vehicle and the trailer. Accordingly, further advancements may be desired.

SUMMARY OF THE INVENTION

According to one aspect of the present invention, a vehicle control system is disclosed. The system comprises at least one detection device configured to capture detection data. The system further includes a controller that identifies a travel path of a vehicle extending from a current position to a target position of the vehicle. In response to the travel path, the controller calculates a travel zone occupied by the vehicle traversing the travel path and determines at least one viewing zone proximate to the travel zone. The controller further determines a location of a user based on the detection data and controls a navigation routine of the vehicle along the travel path in response to a location of the user relative to the at least one viewing zone.

Aspects of the invention may include any one or a combination of the following features:
- a perimeter of the travel zone is calculated based on an exterior boundary and an orientation of the vehicle traversing the travel path;
- a vehicle maneuvering system that controls a velocity and a steering angle of the vehicle along the travel path in response to instructions received from the controller;
- the controller further detects a location of the remote device via the communication module;
- in response to the location outside the viewing zone, the controller further generates an instruction to relocate the remote device in the viewing zone, wherein the instruction provides at least one of a direction and a distance to relocate the remote device in the viewing zone;
- in response to the location outside the viewing zone, the controller further controls the vehicle to suspend the navigation routine of the vehicle along the travel path;
- the controller further instructs the remote device to demonstrate a simulated scene demonstrating the travel zone of the vehicle and the viewing zone, wherein the location of the remote device is further demonstrated in the simulated scene;
- an imager configured to capture image data in a field of view proximate to the vehicle;
- the controller further identifies a coupler position of a trailer in the image data and calculates the travel path to the target position aligning a coupler of the vehicle with a hitch of the trailer;
- the at least one viewing zone comprises a first viewing zone and a second viewing zone, the first viewing zone located adjacent to a first side portion of the vehicle along the travel path and the second viewing zone located adjacent to a second side portion of the vehicle along the travel path;
- the controller further detects an object the first viewing zone and, in response to the detection of the object, controls the remote device to output an instruction to position the user in the second viewing zone; and/or
- the instruction further instructs that remote device to remove the first viewing zone in response to the object detected in the first viewing zone.

According to another aspect of the present invention, a method for enforcing a viewing zone for monitoring a semi-automated vehicle operation is disclosed. The method includes identifying a travel path of a vehicle. The travel path includes a travel zone of the vehicle extending from a current position to a target position. In response to the travel path, the method further comprises calculating the travel zone occupied by the vehicle traversing the travel path and determining a perimeter of at least one viewing zone based on the travel zone. In response to a location of a user relative to the perimeter of the at least one viewing zone, the method further includes controlling a navigation routine of the vehicle along the travel path.

Aspects of the invention may include any one or a combination of the following features:
- the location of the user is detected based on a position of a remote device identified via a communication module;
- in response to detection of the remote device in the location outside the viewing zone, generating an instruction to relocate the remote device in the viewing zone, wherein the instruction provides at least one of a direction and a distance to relocate the remote device in the viewing zone; and/or
- in response to detection of the remote device in the location outside the viewing zone, controlling the vehicle to suspend a maneuvering routine along the travel path.

According to yet another aspect of the present invention, a system for assisting in aligning a vehicle for hitching with a trailer is disclosed. The system comprises a vehicle maneuvering system that controls a velocity and a steering angle of the vehicle along a travel path. The system further comprises an imaging system that captures and processes image data in a field of view. A controller identifies a coupler position of a trailer in the image data and calculates the travel path extending from a current position to a target position of the vehicle. The target position aligns a coupler of the vehicle with a hitch of a trailer. Based on the travel path, the controller calculates a travel zone occupied by the vehicle traversing the travel path and determines at least one viewing zone proximate to the travel zone. In response to the position of the remote device relative to the at least one viewing zone, the controller controls a navigation routine of the vehicle along the travel path.

The invention may also include configurations wherein the controller further detects a location of the remote device via the communication module and, in response to the location outside the viewing zone, controls the vehicle to suspend the navigation routine of the vehicle along the travel path.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
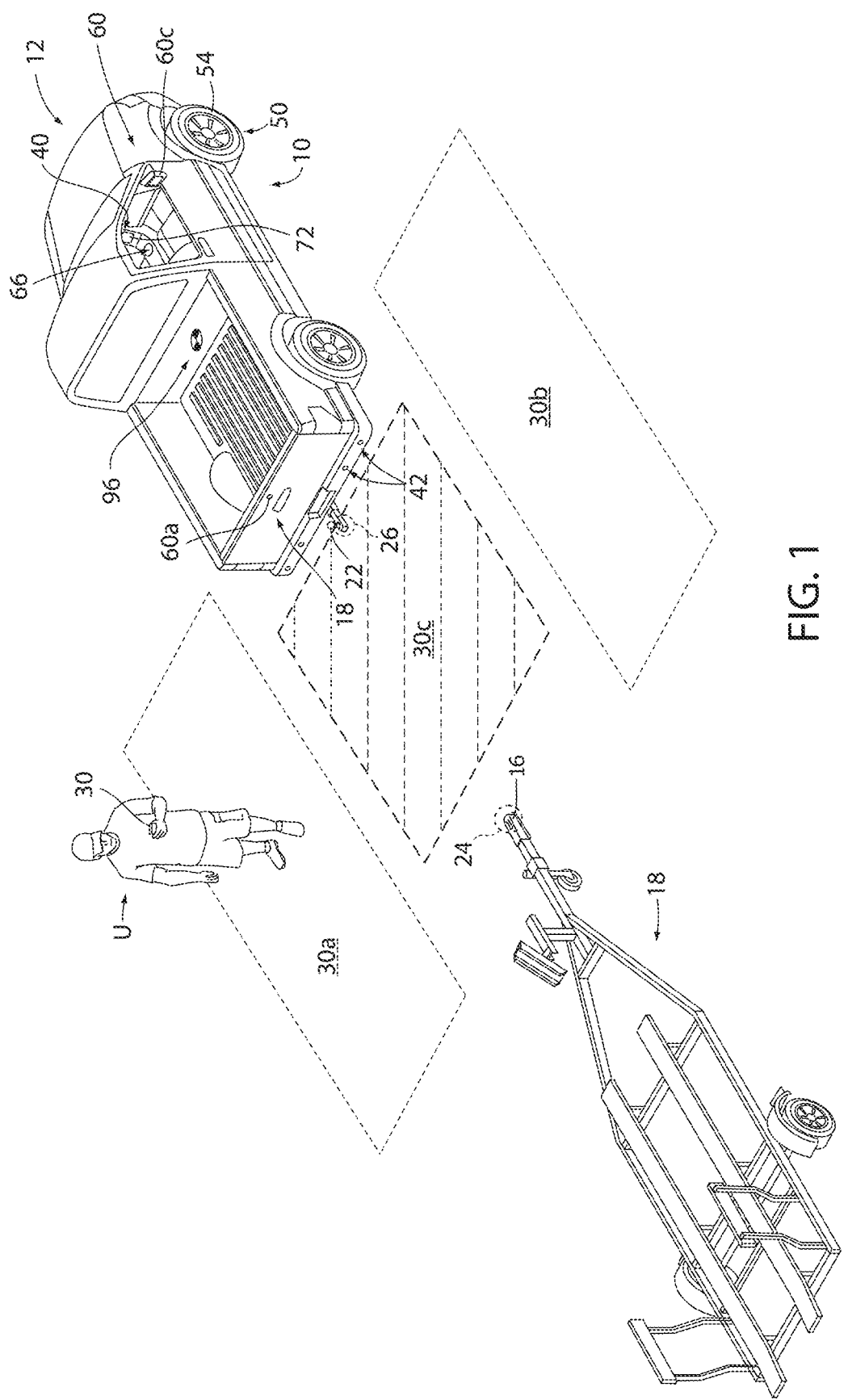
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch 22 (e.g., a hitch ball) of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide improved navigation of the vehicle 12 and/or interaction with the coupler 16, such that trailer 18 may be effectively connected to the vehicle 12 without complication.

In some embodiments, the system 10 may be in communication with a remote device 30. The remote device 30 may serve as a peripheral device or remote user interface that communicates operating instructions and a status of the system 10 between the user U and the controller 14 of the system 10 via a communication interface. In operation, the system 10 may communicate the vehicle path 20 or information related to the vehicle path 20 to the remote device 30. Based on the vehicle path 20, the remote device 30 may be configured to calculate at least one viewing zone 30a, 30b outside of a travel zone 30c of the vehicle 12 along the travel path 20. The travel zone 30c may be calculated based on the orientation and proportions of the vehicle 12 (e.g., the perimeter of the vehicle 12) in a simulated traversal of the vehicle path 20. Additionally, the controller 14 of the system 10 may track a location of the remote device 30 in order to infer the location of the user U proximate to the vehicle 12. Based on the location of the remote device 30, the controller 14 and/or the remote device 30 may identify and communicate whether the remote device and, by association, the user U are in the at least one viewing zone 30a, 30b. In response to an identification that the remote device 30 is outside the at least one viewing zone 30a, 30b; the controller 14 of the system 10 may suspend the motion of the vehicle along the vehicle path 20. The operation of the remote device 30 in coordination with the controller 14 is further discussed in reference to FIGS. 5-12.

Figure 2:
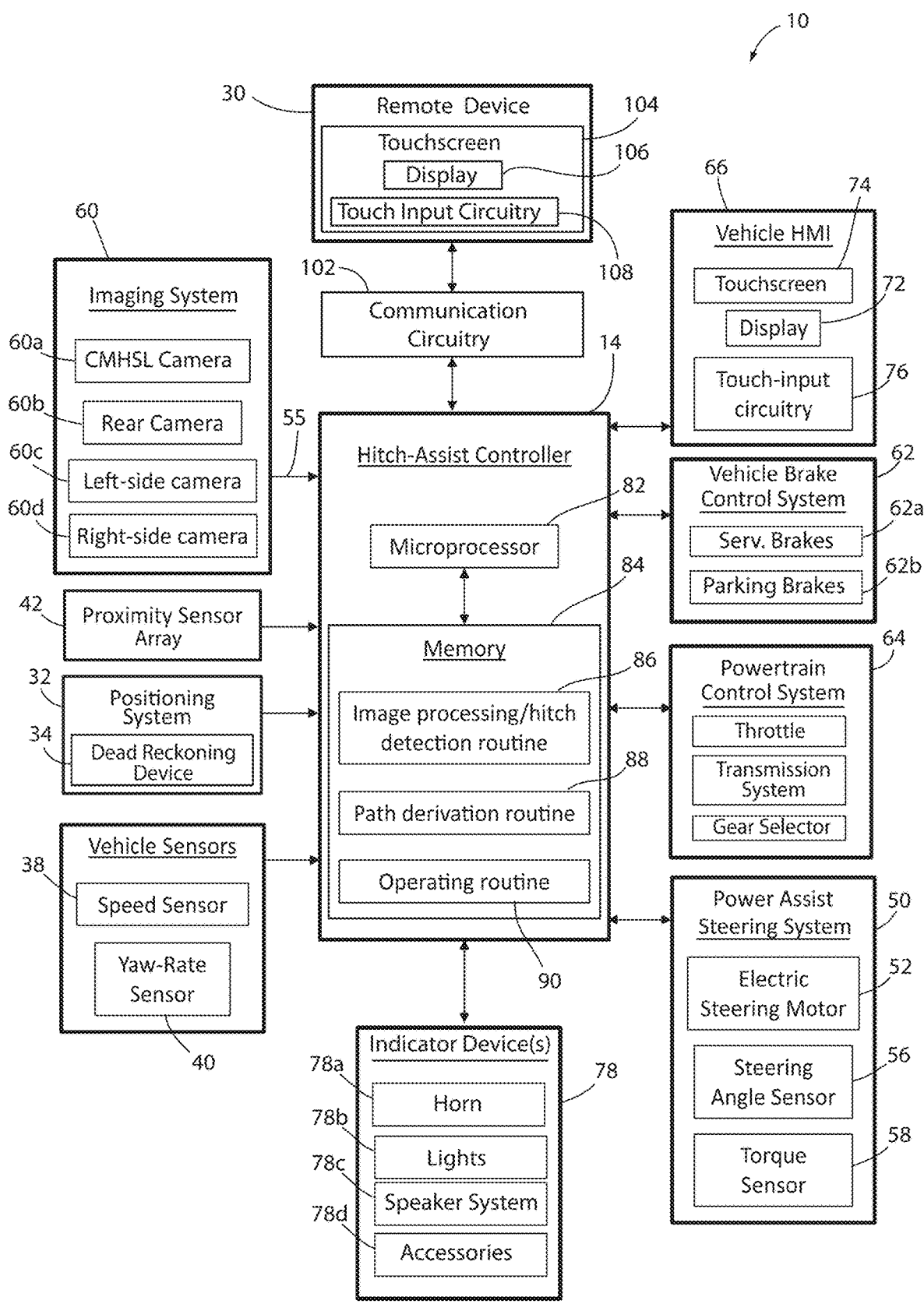
FIG. 2 is a diagram of a system according to an aspect of the disclosure for assisting in aligning the vehicle with a trailer in a position for hitching the trailer to the vehicle.
Figure 3:
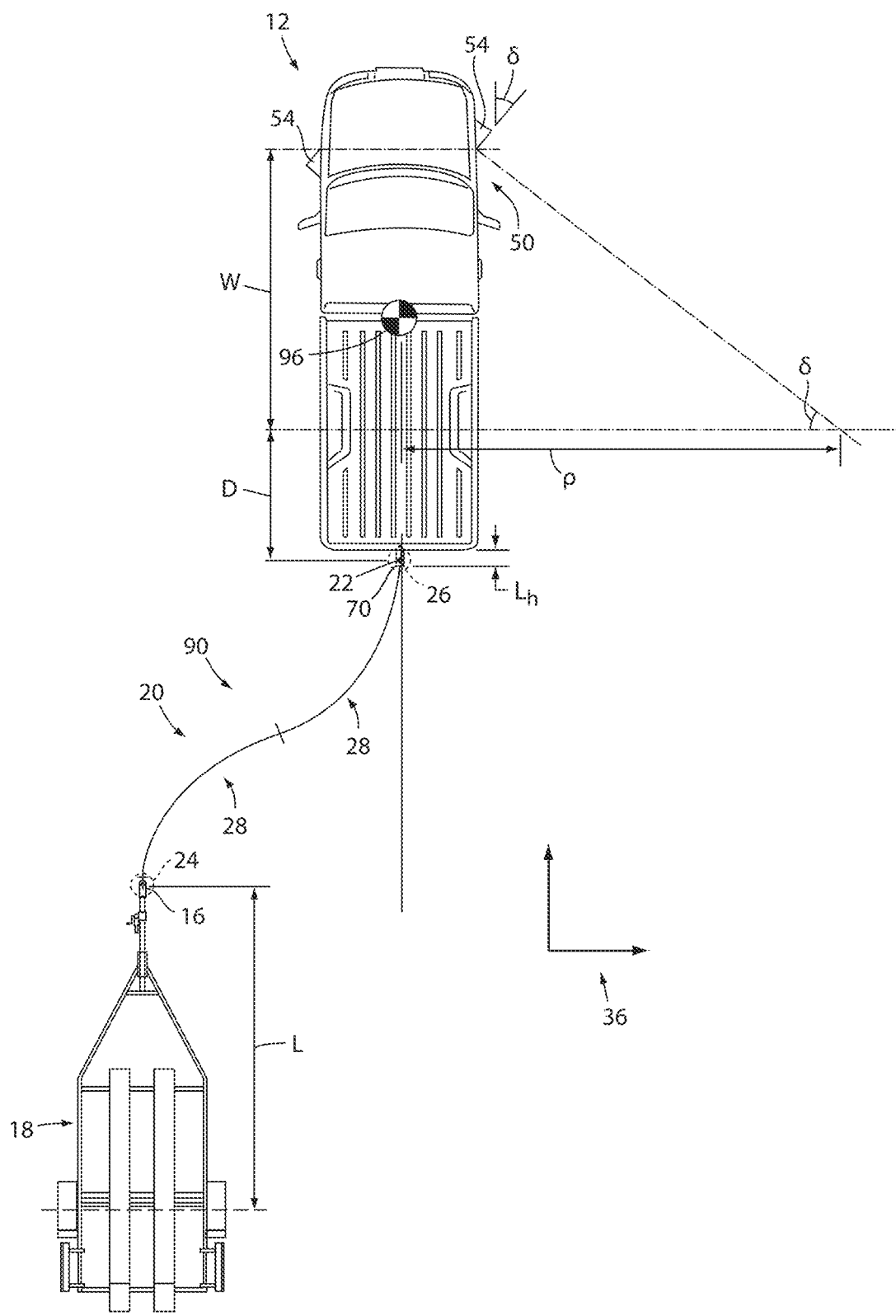
FIG. 3 is a plan view of a vehicle during a step of the alignment sequence with the trailer.
Figure 4:
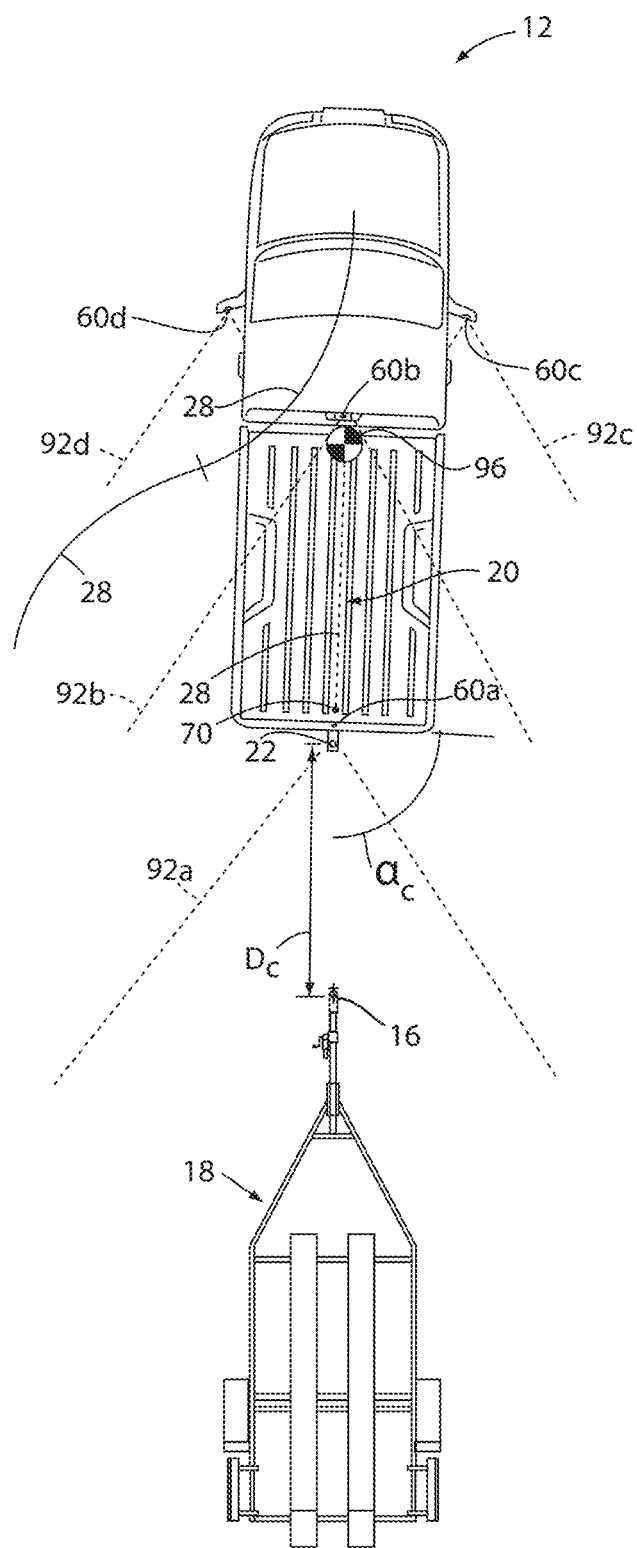
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition to or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from an inertial measurement unit (IMU) 40. In various embodiments, the IMU 40 may comprise or be in communication with a variety of sensors including, but not limited to, a gyroscope, an inclinometer, and/or an accelerometer. Additionally, the mass of the vehicle 12 may be measured by one or more weight sensors or pressure sensors in communication with the controller 14. Further, it is contemplated that in additional embodiments a proximity sensor 42, or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of coupler 16. As discussed herein, the proximity sensor 42 may correspond to a radar sensor, laser sensor, ultrasonic sensor, inductive, or various sensory devices that may be implemented or incorporated with the vehicle 12. In an exemplary embodiment, the at least one detection sensor may correspond to an image-based detection system (e.g., a camera system), which may comprise a plurality of imaging devices As further shown in FIG. 2, one embodiment of the hitch assist system 10 is in communication with the steering system 50 of vehicle 12. The steering system 50 may be a power-assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power-assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power-assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power-assist steering system 50 that senses torque on the steering wheel that is not expected from autonomous control of the steering wheel and, therefore, indicative of manual intervention. In this configuration, the hitch assist system 10 may alert the driver to discontinue manual intervention with the steering wheel and/or discontinue autonomous steering. In alternative embodiments, some vehicles have a power-assist steering system 50 that allows a steering wheel to be partially decoupled from the movement of the steered wheels 54 of such a vehicle.

With continued reference to FIG. 2, the power-assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle 12 conditions to guide the vehicle 12 along the desired path 20 (FIG. 3). It is conceivable that the hitch assist system 10, in additional embodiments, may be an integrated component of the power-assist steering system 50. For example, the power-assist steering system 50 may include a hitch assist algorithm for generating vehicle steering information and commands as a function of all or a portion of information received from an imaging system 60, the power-assist steering system 50, a vehicle brake control or brake system 62, a powertrain control system 64, and other vehicle sensors and devices, as well as a human-machine interface ("HMI") 66, as discussed further below.

As also illustrated in FIG. 2, the vehicle brake control system 62 may communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle IMU 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a contact with trailer 18 and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated contact with a portion of trailer 18. As mentioned above, regulation of the speed of the vehicle 12 may be advantageous to prevent contact with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with a human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place of or in addition to touchscreen 74. Further, the hitch assist system 10 may communicate via wireless communication with another embodiment of the HMI 66, such as with one or more handheld or remote devices 80 (FIG. 1), including one or more smartphones. The remote device 80 may also include the display 72 for displaying one or more images and other information to a user U. For instance, the remote device 80 may display one or more images of the trailer 18 on the display 72 and may be further configured to receive remote user inputs via touchscreen circuitry 76. In addition, the remote device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the remote device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power-assist steering system 50, the vehicle brake control system 62, the powertrain control system 64, and other vehicle sensors and devices. The controller may communicate with the various devices described herein via a communication network of the vehicle 12, which can include a controller area network (CAN), a local interconnect network (LIN), or other protocols used in the automotive industry. The controller 14 may generate vehicle steering information and commands as a function of all or a portion of the information received. Thereafter, the vehicle steering information and commands may be provided to the power-assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power-assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of any other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker, so that the position 24 of the coupler 16 can be determined based on the marker location.

Additionally or alternatively, controller 14 may seek confirmation of the determined coupler 16 via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266, 023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch 22. In this manner, upon initiation of hitch assist system 10, such as by user input on touchscreen 74, for example, image processing routine 86 can identify coupler 16 within the image data of camera 60c and estimate the position 24 of coupler 16 relative to hitch 22. The position 24 of the coupler 16 may be identified by the system 10 using the image data by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch 22 with coupler 16.

Continuing with reference to FIGS. 3 and 4 with additional reference to FIG. 2, controller 14, having estimated the positioning $D_c$, $\alpha_c$ of coupler 16 as discussed above, can, in one example, execute path derivation routine 88 to determine vehicle path 20 to align the vehicle hitch 22 with coupler 16. In particular, controller 14 can have stored in memory 84 various characteristics of vehicle 12, including the wheelbase W, the distance from the rear axle to the hitch 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta} \quad (1)$$

in which the wheelbase W is fixed and the steering angle $\delta$ can be controlled by controller 14 by communication with the steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch 22 with the estimated position 24 of coupler 16 that takes into account the determined minimum turning radius $\rho_{min}$, to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch 22, based on length L, relative to the tracked location of vehicle 12 (which may correspond with the center 96 of mass of vehicle 12, the location of a GPS receiver, or another specified, known area) to determine the needed positioning of vehicle 12 to align hitch 22 with coupler 16.

Referring again to FIGS. 1 and 2, in some instances, the HMI 66 further includes an input device, which can be implemented by configuring the display 72 as a portion of the touchscreen 74 with input circuitry 76 to receive an input corresponding with a location over the display 72. Other forms of input, including one or more joysticks, digital input pads, or the like, can be used in place of or in addition to touchscreen 74.

Further, the hitch assist system 10 may be communicatively coupled via a communication circuitry 102 with one or more handheld or remote devices 30 (FIG. 1), Which may additionally and/or alternatively be configured as the user-input device. The communication circuitry 102 may include a radio frequency transmitter and receiver for transmitting and receiving signals. The signals may be configured to transmit data and may correspond to various communication. protocols. The communication. circuitry 102 may be used to send and receive data and/or audiovisual content. The communication circuitry 102 may utilize one or more of various wired or wireless communication mechanisms, including, any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver configured to communicate via one or more wireless protocols (e.g., a Bluetooth®, Bluetooth® Low Energy [BLE], Ultra-Wideband [UWB]; and Z-Wave®; Zigbee®, Wi-Fi [802.11a, b, g, n, etc.], IrDA, RFID, etc.), local area networks (LAN), wide area networks (WAN), including the Internet, GSM, CDMA, WCDMA, GPRS, MBMS, WiMax, DVB-H, ISDB-T, etc., as well as advanced communication protocols that may be developed at a later time.

In various implementations, the system 10 may identify the location of the remote device 30 proximate the vehicle based on one or more location detection techniques, which may be attributed to the communication circuitry 102. For example, the communication circuitry 102 may detect the location of the remote device 30 based on time of flight detection as well as an angle of arrival or angle of departure directional signal determination based on RSS (Received Signal Strength), AOA (Angle of Arrival), TOA (Time of Arrival), and TDOA (Time Difference of Arrival), which may be supported by one or more wireless protocols (e.g., Bluetooth® Low Energy (BLE), Ultra-Wideband, etc.). Based on these methods, the location of the remote device 30 and the inferred location of the user U may be identified within a range of less than 20 centimeters. Additionally, the location of the remote device 30 may be detected in the image data by detecting an associated location of the user U identified in the image data captured by the imaging system 60. As further discussed in reference to FIGS. 7 and 8, the image data may be displayed on the display 72 of the HMI 66 and/or on the remote device 30.

The remote device 30 may also include a touchscreen 104 having a display 106 for displaying graphic data 110 or simulated scenes 122 (FIGS. 7 and 8) and other information to a user U and touch input circuitry 1108. For instance, the remote device 30 may display the graphic data 110 of the trailer 18 on the display 106 and may be further able to receive remote user inputs via the touch input circuitry 108. In addition, the remote device 30 may provide feedback information, such as visual, audible, and tactile alerts. It will be appreciated that the remote device 30 may be any one of a variety of computing devices and may include a processor and memory. For example, the remote device 30 may be a cell phone, mobile communication device, key fob, wearable device (e.g., fitness band, watch, glasses, jewelry, wallet), personal digital assistant, headphones and/or other devices that include capabilities for wireless communications and/or any wired communications protocols.

Referring now to FIGS. 1 and 5-12, the coordinated operation of the system 10 in combination with the remote device 30 is discussed in further detail. In operation, the remote device 30 may serve as a peripheral device or remote user interface to support remote operation of the vehicle 12 with the user U located outside of a passenger compartment 120 of the vehicle 12. In some instances, the controller 14 may communicate the vehicle path 20 or information related to the vehicle path 20 to the remote device 30 via the communication circuitry 102. Based on the vehicle path 20, the controller 14 and/or the remote device 30 may be configured to calculate a first viewing zone 30a and a second viewing zone 30b outside of the travel zone 30c of the vehicle 12. As previously discussed, the travel zone 30c may be calculated based on the orientation and proportions of the vehicle 12 (e.g., the perimeter of the vehicle 12) in a simulated traversal of the vehicle path 20. More specifically, the controller 14 and/or the remote device 30 may simulate the steering angles and corresponding orientation required for the vehicle 12 to traverse the vehicle path 20. In this way, the remote device 30 may be operable to display a simulated scene 122 of the travel zone 30c and the related viewing zones 30a and 30b of the vehicle 12 as depicted by the graphic data 110 demonstrated in FIGS. 7 and 8.

Figure 5:
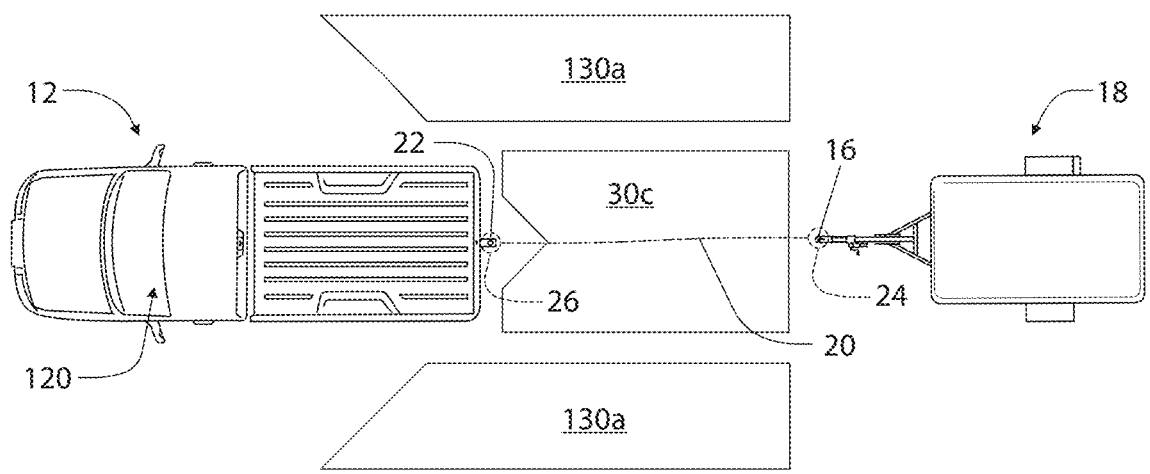
FIG. 5 is a plan view of a vehicle and a trailer demonstrating a hitch viewing zone.
Figure 6:
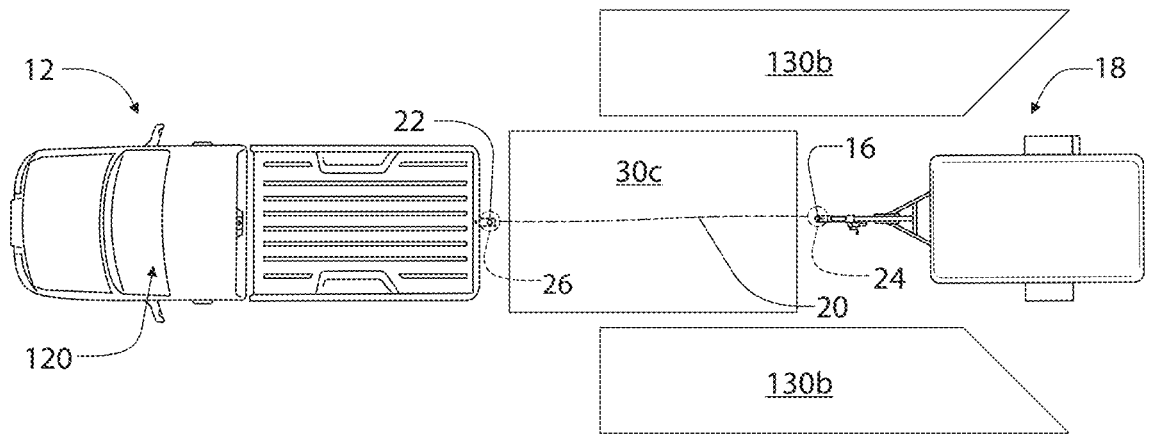
FIG. 6 is a plan view of a vehicle and a trailer demonstrating a coupler viewing zone.

Referring now to FIGS. 5 and 6, a plan view of the vehicle 12 and the trailer 18 are shown demonstrating a hitch viewing zone 130a of the hitch 22 and a coupler viewing zone 130b of the coupler 16 are shown. In some instances, the viewing zones 30a and 30b may be calculated and simulated based on the geometry of each of the vehicle 12 and the trailer 18 based on the estimated or assigned height of the user U. For example, the regions surrounding the vehicle 12 from which the user U may have a line of sight to the hitch 22 may vary based on the proportions of the vehicle (e.g., width, box-side height, truck/tailgate height, and proportions, etc.) and the height of the user U. The geometry of the vehicle 12 may be programmed in the memory 84 of the system 10 by the manufacturer. Accordingly, based on the predetermined or user-defined height of the user U, the controller 14 of the system 10 may define the hitch viewing zone 130a proximate to the vehicle 12 and outside of the travel zone 30c.

The system 10 may further be configured to calculate the coupler viewing zone 130b based on the geometry of the trailer 18. Unlike the geometry of the vehicle 12, the geometry of the trailer 18 may vary and may not be specifically defined by a manufacturer of the vehicle 12. The geometry of the trailer 18 may be entered by the user U or loaded via a trailer database accessible by the controller 14 via the communication circuitry 102. The entry of the trailer geometry may be assisted based on a recognition of a type or category of the trailer 18 identified via an image processing algorithm of the controller 14. Accordingly, a category or template for the trailer 18 may be assigned by the controller 14 based on the image data and processed via processing techniques similar to those discussed in reference to the image processing routine 86. In this way, the controller may detect and/or receive inputs identifying the geometry of the trailer 18, and, based on the trailer geometry and the height of the user U, the controller 14 may define the coupler viewing zone 130b.

Once the hitch viewing zone 130a and the coupler viewing zone 130b are determined, the controller 14 may define the viewing zones 30a and 30b as the union between the hitch viewing zone 130a and the coupler viewing zone 130b. With the hitch viewing zones 30a and 30b defined for the combination of the vehicle 12 and the trailer 18, the system 10 may control the vehicle HMI 66 and/or the remote device 30 to display the simulated scene 122 of the travel zone 30c and the related viewing zones 30a and 30b based on the specific geometry of the vehicle 12 and the trailer 18 as demonstrated and further discussed in reference to FIGS. 7 and 8. In this way, the system 10 may communicate a position for the user U to stand with the remote device 30 to provide an optimum view of the alignment of the hitch 22 of the vehicle 12 with the coupler 16 of the trailer 18.

Additionally, the location of the remote device 30 may be detected in the image data by detecting an associated location of the user U identified in the image data captured by the imaging system 60. As further discussed in reference to FIGS. 7 and 8, the image data may be displayed on the display 72 of the HMI 66 and/or on the remote device 30.

Figure 7:
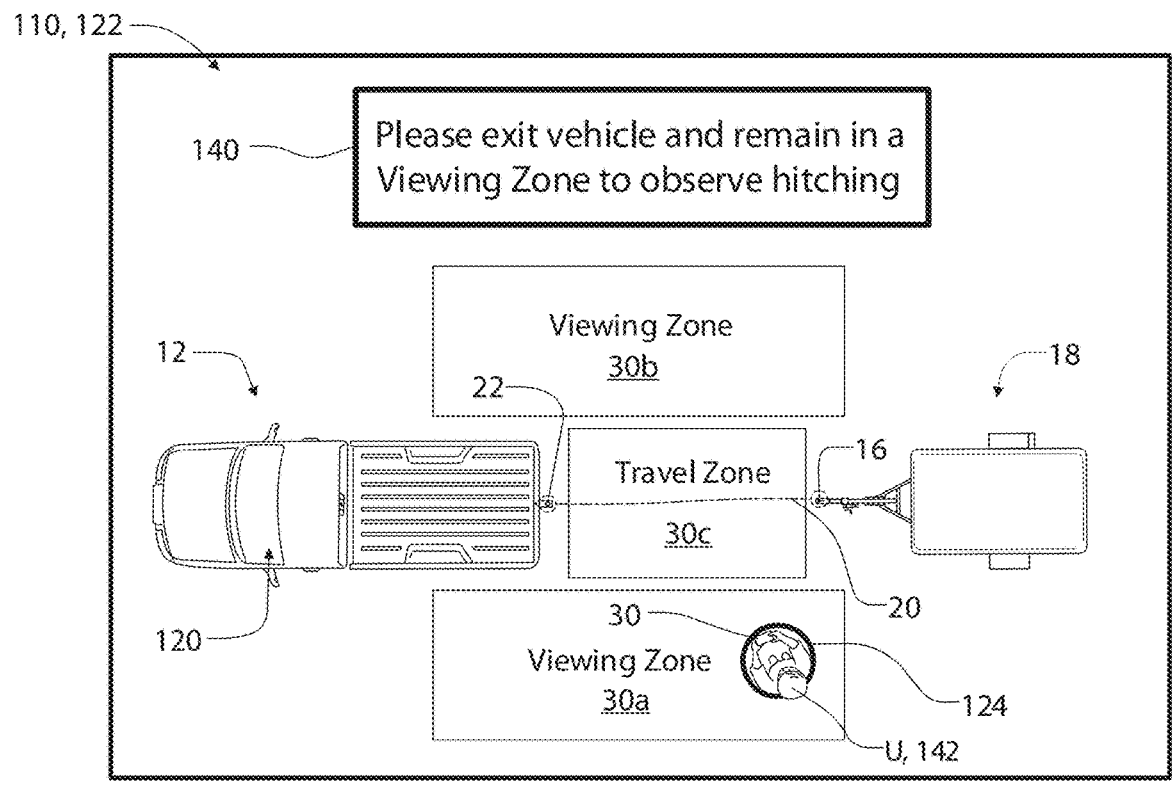
FIG. 7 is a graphical depiction of a simulated scene of a vehicle and a trailer demonstrating a viewing zone.
Figure 8:
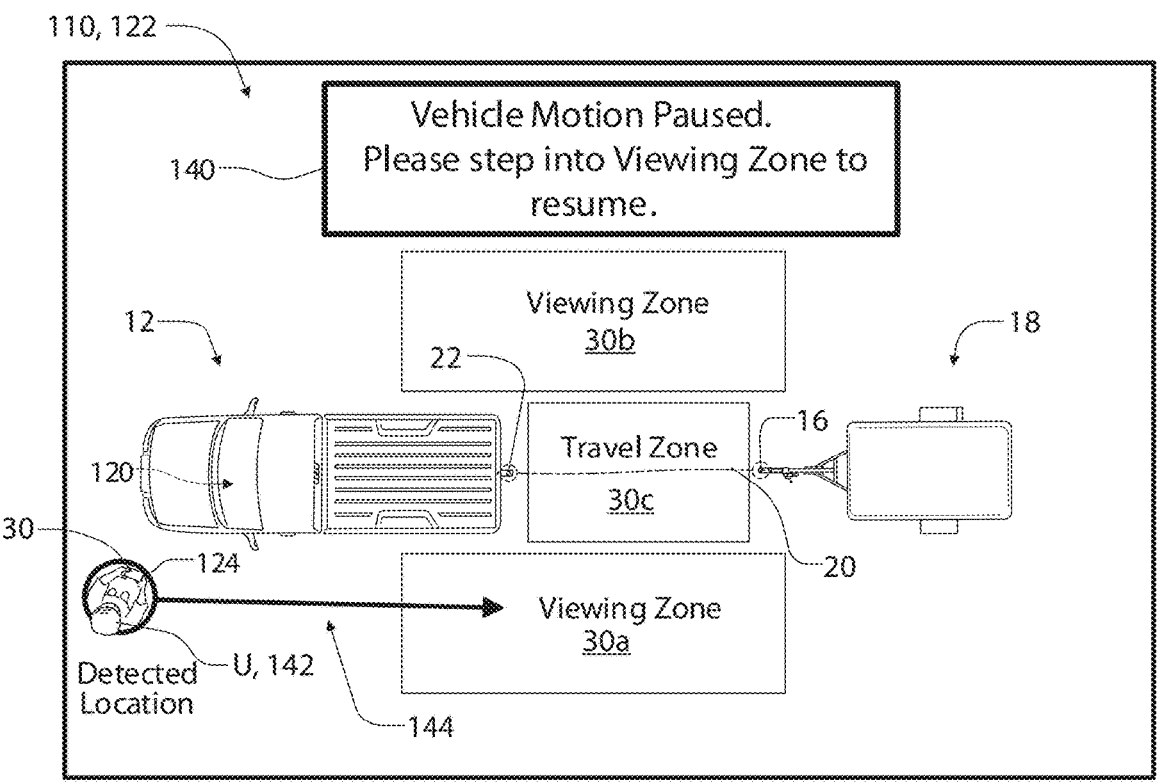
FIG. 8 is a graphical depiction of a simulated scene of a vehicle and a trailer demonstrating a viewing zone.

Referring now to FIGS. 7 and 8, the simulated scene 122 of the vehicle 12 and the trailer 18 is shown demonstrating the viewing zones 30a and 30b as well as the travel zone 30c. In operation, the simulated scene 122 may be updated based on the movement of the vehicle 12 along the vehicle path 20 as well as a location 124 of the remote device 30. In this way, the system 10 may provide for the display of the simulated scene 122 on the HMI 66 and/or the remote device 30. The simulated scene 122 may further include one or more instructions 140, which may guide the user U to move in order to locate the remote device 30 in one of the viewing zones 30a, 30b. In this way, the system 10 may communicate graphical instructions to coach and instruct the user U to be positioned within and thereby locate the remote device 30 within the viewing zone 30*a*, 30*b*, while implementing the operating routine 90.

As depicted in FIG. 7, the simulated scene 122 is shown including the instruction 140 directing the user U to exit the vehicle 12 and position the remote device 30 in one of the viewing zones 30*a*, 30*b*. In operation, the simulated scene 122 depicted on the HMI 66 and/or remote device 30 may demonstrate an estimated position of the vehicle 12 in relation to the trailer 18 and the corresponding travel zone 30*c* positioned therebetween along the vehicle path 20. Additionally, a user symbol 142 may be depicted in the simulated scene 122 identifying a relative location of the remote device 30 and an inferred location of the user U. As depicted in FIG. 7, the user U is located in the first viewing zone 30*a*. In this way, the system 10 may provide instructions and feedback to the user U, such that the user may easily be located in one of the viewing zones 30*a*, 30*b* and outside the travel zone 30*c* of the vehicle 12.

Referring now to FIG. 8, the simulated scene 122 demonstrates additional instructions 140 communicated to the user U to assist in the completion of the operating routine 90. As further discussed in reference to FIG. 12, the disclosure may provide for the remote operation of the vehicle 12 via the remote device 30 and may track the location of the remote device 30 to enable the motion of the vehicle along the vehicle path 20. During such operation, the controller 14 of the system 10 may halt or suppress the motion of the vehicle 12 in response to the remote device 30 and the inferred location of the user U being outside the viewing zones 30*a*, 30*b*. As depicted in FIG. 8, the instruction 140 indicates that the vehicle motion is paused and requests the user to step into one of the viewing zones 30*a*, 30*b* to resume the operating routine 90. As previously discussed, the simulated scene 122 may include the user symbol 142 identifying a location of the remote device 30 approximate the vehicle 12 and the trailer 18. Additionally, the simulated scene 122 may include a graphical representation of a positioning instruction 144, which may assist the user U in identifying where to move in order to enter one of the viewing zones 30*a*, 30*b*. Accordingly, the system of may provide for the simulated scene 122 to be displayed on the display 72 of the HMI 66 and/or the display 106 of the remote device 30 in accordance with the disclosure.

As previously discussed, the system 10 may identify the location of the remote device 30 by monitoring communication signals to and from the remote device 30 via the communication circuitry 102. The location of the remote device 30 may, therefore, be detected by the system 10 based on RSS (Received Signal Strength), AOA (Angle of Arrival), TOA (Time of Arrival), and TDOA (Time Difference of Arrival), which may be supported by one or more wireless protocols (e.g., Bluetooth® Low Energy (BLE), Ultra-Wideband, etc.). Additionally, the location of the remote device 30 may be used to infer the location of the user U. Though specific locating techniques are described herein in reference to the detection of the location of the remote device 30, the system 10 may utilize various techniques including ultrasonic proximity detection, mono or stereoscopic imaging, LIDAR (laser imaging, detection, and ranging), etc. Accordingly, the methods and system described herein may be implemented via a variety of sensory technologies without departing from the spirit of the disclosure.

Figure 9:
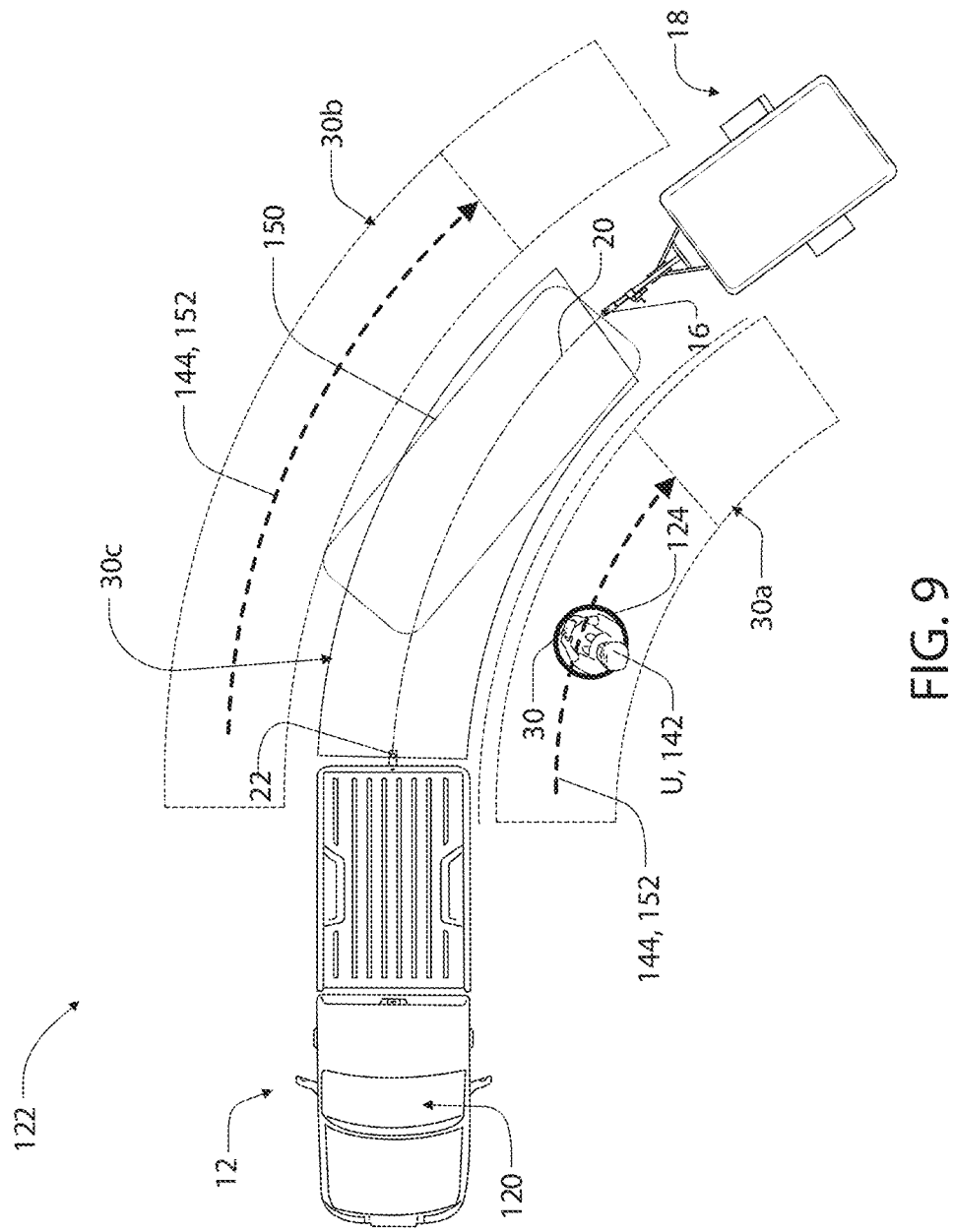
FIG. 9 is a simulated scene of a vehicle navigating to a target position aligned with a trailer demonstrating a plurality of viewing zones.

FIG. 9 demonstrates a plan view of the vehicle 12 navigating along the vehicle path 20 to a target location or position 150. The target location 150 may correspond to a position where the hitch 22 of the vehicle 12 is aligned with the coupler 16 of the trailer 18. As shown, the travel zone 30*c* of the vehicle 12 may extend along the vehicle path 20 and may be calculated based on the orientation and proportions of the vehicle (e.g., the perimeter of the vehicle) based on a simulated traversal of the vehicle path 20. In this way, the system may calculate the travel zone 30*c* of the vehicle 12 and provide an indication to the user U identifying at least one viewing zone 30*a*, 30*b* from which to observe and/or control the operation of the vehicle 12 during the operating routine 90.

As previously discussed, the viewing zones 30*a*, 30*b* may be calculated as the union of the hitch viewing zone 130*a* and the coupler viewing zone 130*b*, which are positioned on opposing sides of the travel zone 30*c* outside the maneuvering path of the vehicle 12. In various implementations, the proportions of the viewing zones 30*a*, 30*b* may be fixed or may be adjusted to optimize the view of the hitch 22 and the coupler 16 throughout the operating routine 90. For example, arrows 152 represent the changing boundary of each of the viewing zones 30*a*, 30*b* based on the position of the vehicle 12 along the vehicle path 20. In such instances, the user U may be instructed to relocate the remote device 30 within the viewing zones 30*a*, 30*b* in response to the changing proportions of the viewing zones 30*a*, 30*b*. The changing proportion of the viewing zones 30*a*, 30*b*, as represented by the arrows 152, may be the result of a change in the hitch viewing zone 130*a* as a result of the movement of the vehicle 12 along the vehicle path 20. In such implementations, the system 10 may be operable to display instructions in the simulated scene 122 identifying the changing boundaries of the viewing zones 30*a*, 30*b* and instructing the user U to maintain the remote device 30 within the changing proportions of the viewing zone 30*a*, 30*b*.

In addition to or alternatively to the display of the simulated scene 122, the system 10 may be configured to output various indications instructing the user U to maintain a position within one of the viewing zones 30*a*, 30*b*. For example, the controller 14 may control the indicator devices 78 of the vehicle 12 (e.g., the lights 78*b*, the speaker system 78*c*, the accessories 78*d*, etc.) to instruct the user U to move away from, further behind, or in a direction relative to a portion of the vehicle 12. For example, the controller 14 may illuminate the taillights of the vehicle 12 with increasing intensity or frequency to identify that the vehicle 12 is approaching the user U. Similarly, the controller 14 may control the turn indicators of the vehicle to instruct the user U to move in a corresponding left or right direction relative to a rear portion of the vehicle 12, such that the user U is positioned within one of the viewing zones 30*a*, 30*b*. Additionally, the controller 14 may output audible instructions to the user U via the speaker system 78*c* instructing a relative location for the user U to move in relation to the vehicle 12. Accordingly, the system 10 may instruct or guide the user U to maintain a position in one of the viewing zones 30*a*, 30*b* in a variety of ways.

Figure 10:
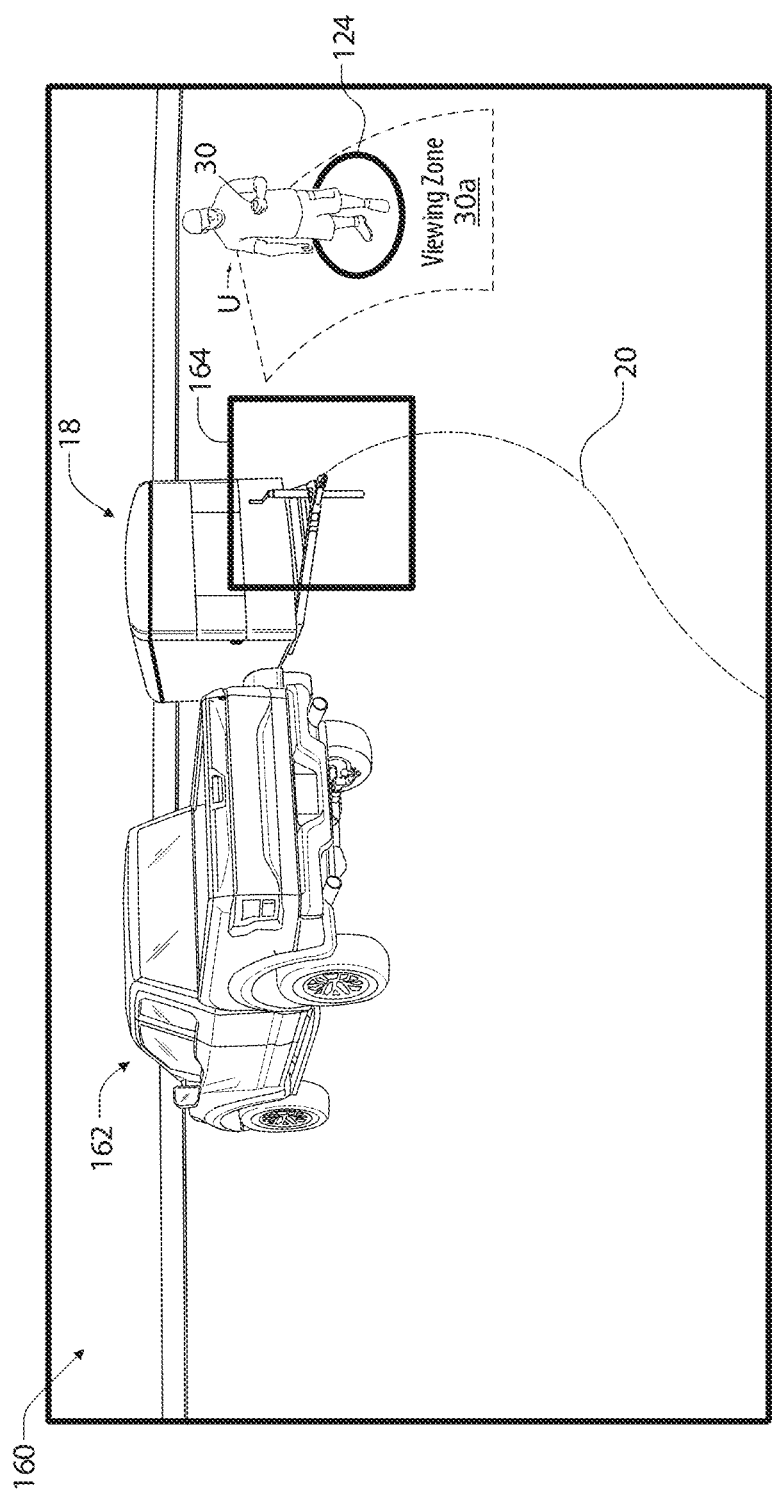
FIG. 10 demonstrates image data captured by a camera of the vehicle including a rendered depiction of a vehicle path and a viewing zone.
Figure 11:
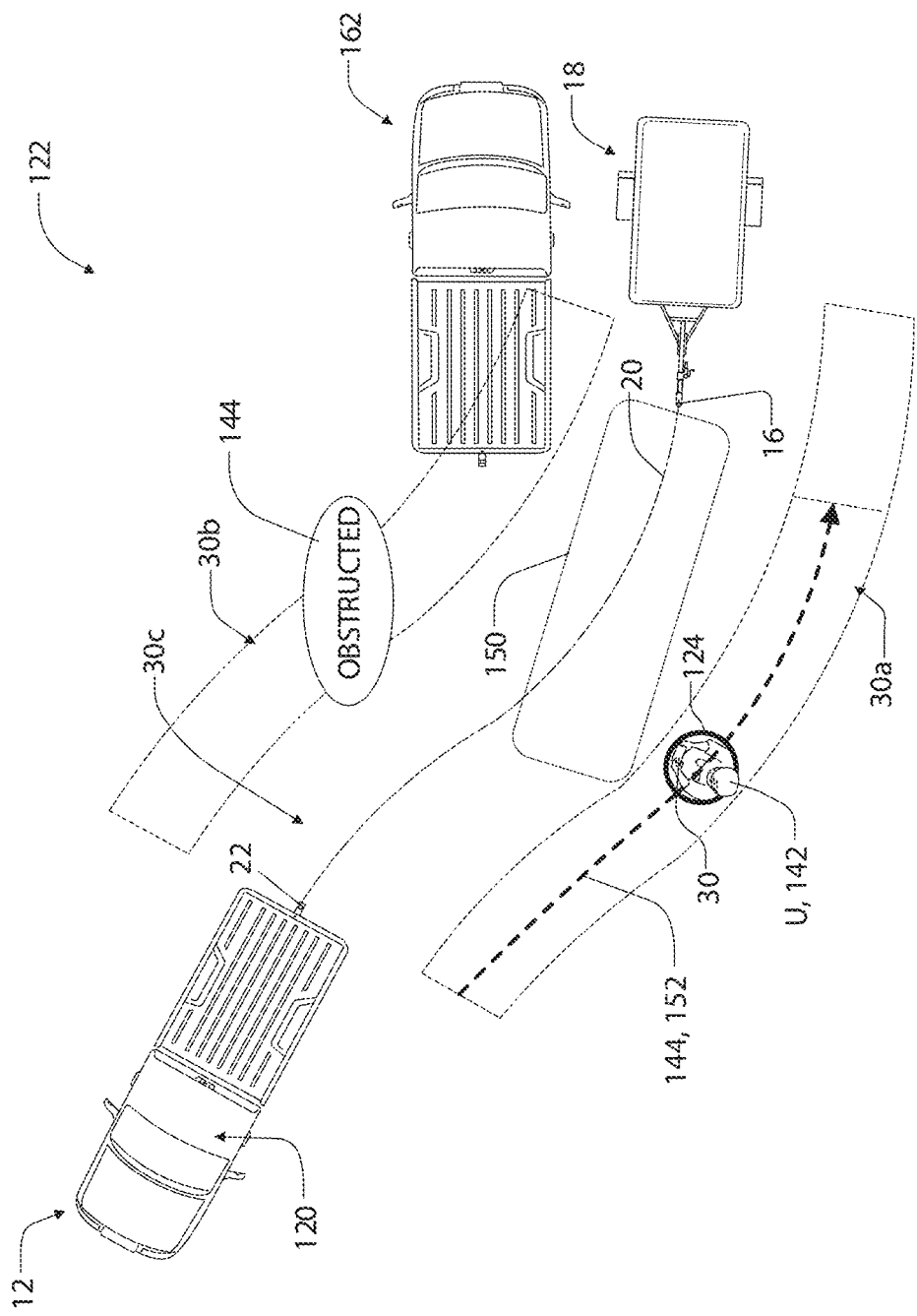
FIG. 11 is a plan view of a vehicle navigating to a target position in alignment with a trailer demonstrating an object or obstruction located in one of the viewing zones.

Referring now to FIGS. 10 and 11, exemplary operation of the system 10 is discussed in reference to the detection of an object or obstruction within one of the viewing zones 30*a*, 30*b*. FIG. 10 demonstrates a rearward directed scene 160 captured by the imaging system 60 of the vehicle 12 demonstrating a graphical representation of the vehicle path 20 and the first viewing zone 30*a*. FIG. 11 depicts a plan view of the scene 160 depicted in FIG. 10. In the example shown, an obstruction or object 162 is located within the second viewing zone 30*b*. As depicted, the obstruction 162 corresponds to an automotive vehicle. However, the obstruction 162 may be identified by the controller 14 as any object or encumbrance that may limit the movement of the user U within or proximate to the boundaries of one of the viewing zones 30a, 30b. In this way, system 10 may insure that each of the viewing zones 30a, 30b are not only suitable for viewing the hitch 22 and the coupler 16 during the operating routine 90 but also that the regions corresponding to the viewing zones 30a, 30b are accessible to the user U.

As shown in FIG. 11, the simulated scene 122 identifies that the second viewing zone 30b is obstructed. Accordingly, the simulated scene 122 demonstrates graphical instructions identifying a location for the user U within the first viewing zone 30a. Additionally, the arrow 152 represents the changing proportions of the first viewing zones 30a and a corresponding path along which the user U may be instructed to relocate as the vehicle 12 is controlled to traverse the vehicle path 20 to reach the target position 150. Accordingly, the system 10 may identify the obstruction 162 for various objects located within one of the viewing zones 30a, 30b and provide corresponding instructions to the user U to position the remote device 30 within the viewing zone 30a, 30b that is unobstructed by the object or obstruction 162.

Referring again to FIG. 10, the rearward directed scene 160 may be displayed on the display 72 on the HMI 66 and/or the display 106 of the remote device 30. The rearward directed scene 160 may include graphical representations of the viewing zones 30a, 30b, shown relative to the coupler 16 and the trailer 18, in the image data captured by the imaging system 60. Additionally, a location of the coupler position 24 may be outlined or emphasized by a border 164 superimposed over the image data. The border 164 may serve to notify the user U of a general location of the identified coupler position 24 of the coupler 16 identified in the rearward directed scene 160. Finally, a graphical representation of the vehicle path 20 may be superimposed over the image data of the rearward directed scene 160 identifying an approximation of the vehicle path extending from the hitch 22 to the coupler 16. Accordingly, the system 10 may provide for visual instructions in the form of the simulated scene 122, as well as enhanced video including graphic overlays superimposed over the rearward directed scene 160. In this way, the system 10 may provide intuitive instruction to the user U to locate the remove device 30 within one of the viewing zones 30a, 30b.

Figure 12:
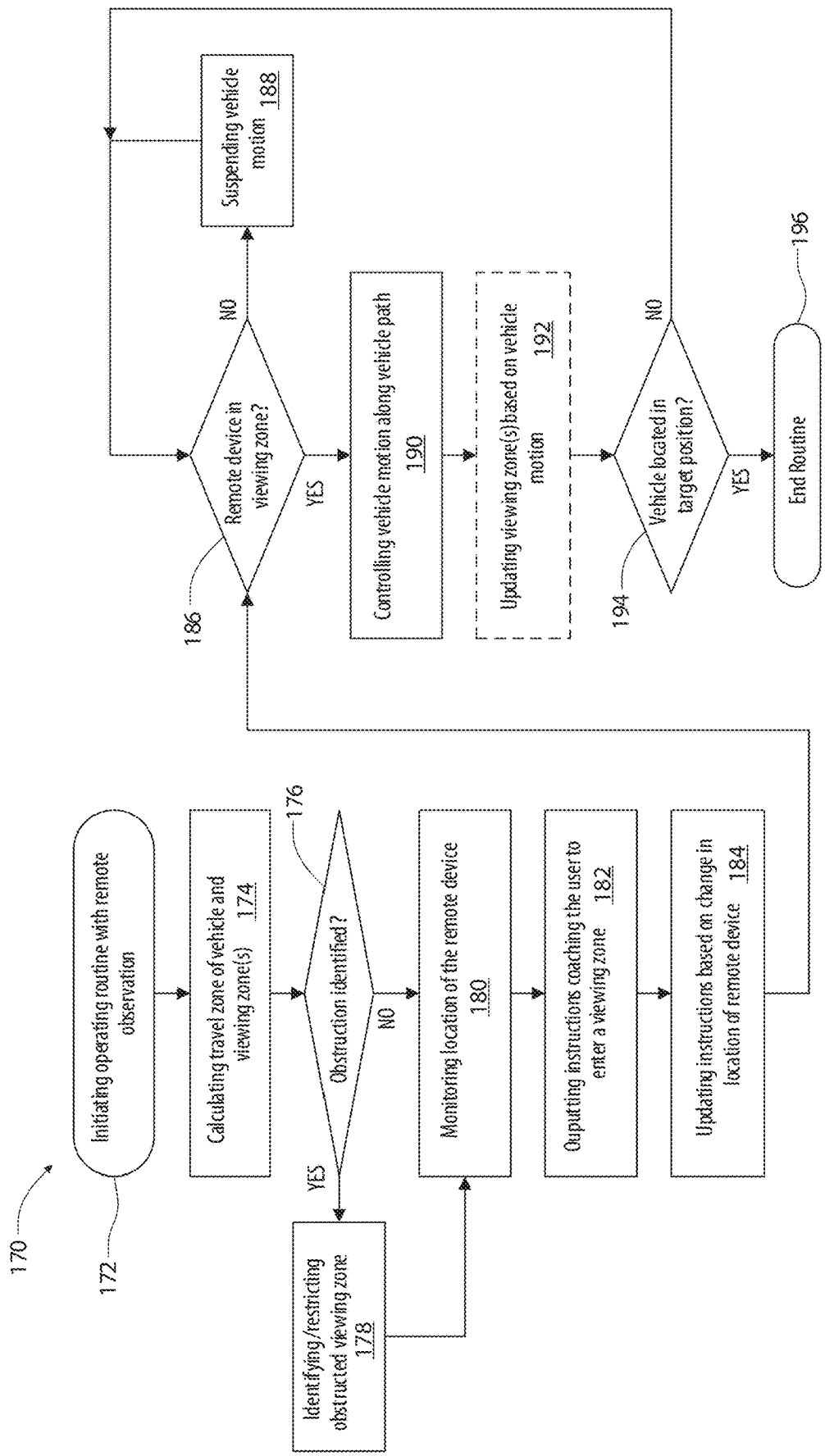
FIG. 12 is a flow chart demonstrating a method for instructing a user/observer to maintain a position within a viewing zone during an automated hitching motion in accordance with the disclosure.

Referring now to FIG. 12, a method 170 for coaching the user U to locate the remote device 30 within one of the viewing zones 30a, 30b is shown. The method 170 may begin in response to initiating the operating routine 90 with a remote observation option selected, allowing the user U to view the navigation of the vehicle 12 from outside the passenger compartment 120 (172). Upon initiation of the operating routine 90, the method 170 may calculate the travel zone 30c of the vehicle 12 and the viewing zones 30a, 30b (174). With the viewing zones 30a, 30b calculated, the controller 14 may scan the image data for various sensor data to determine if an obstruction or object is located in one of the viewing zones 30a, 30b (176). If an obstruction is identified in step 176, the controller 14 may identify the corresponding viewing zone 30a and/or 30b and restrict or withdraw an instruction to the user, such that the obstructed viewing zone is not available for observation (178). If no obstruction is identified in step 176 or following the restriction of one of the viewing zones in step 178, the method 170 may continue to identify a location of the remote device (180).

With the proportions of the viewing zones 30a, 30b and the location of the remote device 30, the controller 14 may output one or more instructions coaching the user U to enter one or either of the viewing zones 30a, 30b (182). As discussed herein, the instructions may be provided to the user U via the display 72 of the HMI 66 and/or the display 106 of the remote device 30. The instructions may also be output via various indicator devices 78 of the vehicle (e.g., the lights 78b, the speaker system 78c, the accessories 78d, etc.) as well as similar indicator devices of the remote device 30 or various other vehicle accessories that may be in communication with the system 10. Additionally, in step 184, the controller 14 may update the instructions communicated to the user U based on detected changes in the location of the remote device 30. Accordingly, the method 170 may provide for a flexible solution to instruct the user U to locate the remote device 30 within one of the viewing zones 30a, 30b.

By continuing to monitor the location of remote device 30, the method 170 may determine if the remote device 30 is located in the viewing zone in step 186. If the remote device 30 is not located in one of the viewing zones 30a, 30b, a motion control operation of the vehicle may be suspended (188). As previously discussed in reference to step 178, if one of the viewing zones 30a, 30b is restricted due to an object or obstruction 162, the detection in step 186 may be limited to one of the viewing zones 30a or 30b that is identified as accessible or unobstructed. If the remote device 30 is identified within one of the viewing zones 30a, 30b in step 186, the method 170 may continue to control the motion of the vehicle 12 along the vehicle path 20 (190).

As previously discussed, the system 10 may provide for updated parameters for proportions of the viewing zones 30a, 30b based on the hitch viewing zone 130a of the hitch 22 resulting from changes in the position or motion of the vehicle 12 (192). Based on the changing proportions of the viewing zones 30a, 30b, the method 170 may continue to monitor the location of the remote device 30 and provide instructions to the user U to locate the remote device 30 in the viewing zone(s) as previously discussed in steps 180, 182, and 184. Finally, based on the continuing motion of the vehicle 12 along the vehicle path 20, the system 10 may identify if the vehicle is located aligned with the target position 150 in step 194. If the vehicle 12 is not aligned with the target position 150 in step 194, the method may return to step 186 to verify that the remote device 30 is located in one of the viewing zones 30a, 30b. If the vehicle 12 is located in the target position 150 in step 194, the method 170 may end as a result of the automated or semi-automated movement of the vehicle 12 being stopped in response to the alignment of the target position 150 (196).

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:
1. A vehicle control system comprising:
at least one detection device configured to capture detection data; and
a controller that:
identifies a travel path of a vehicle extending from a current position to a target position of the vehicle;
in response to the travel path, calculates a travel zone occupied by the vehicle traversing the travel path;

determines at least one viewing zone proximate to and outside of the travel zone, wherein the at least one viewing zone comprises a first viewing zone and a second viewing zone, the first viewing zone located on a first side portion of the vehicle along the travel path and the second viewing zone located on a second side portion of the vehicle along the travel path;

identifies an obstructed region in a portion of the at least one viewing zone and limits the at least one viewing zone based on the obstructed region, wherein the obstructed region is detected in response to an object in the first viewing zone;

determines a location of a user based on the detection data;

in response to the detection of the object, controls a remote device to output an instruction to position the user in the second viewing zone; and controls a navigation routine of the vehicle along the travel path in response to the location of the user relative to the second viewing zone.

2. The control system according to claim 1, wherein a perimeter of the travel zone is calculated based on an exterior boundary and an orientation of the vehicle traversing the travel path.

3. The control system according to claim 1, wherein the controller further:

in response to the location of the remote device outside the second viewing zone, generates an instruction to relocate the remote device in the second viewing zone, wherein the instruction provides at least one of a direction and a distance to relocate the remote device in the viewing zone.

4. The control system according to claim 1, wherein the controller further:

in response to the position of the remote device outside the second viewing zone, controls the vehicle to suspend the navigation routine of the vehicle along the travel path.

5. The control system according to claim 1, wherein the controller further:

instructs the remote device to demonstrate a simulated scene demonstrating the travel zone of the vehicle and the second viewing zone, wherein the location of the remote device is further demonstrated in the simulated scene.

6. The control system according to claim 1, further comprising:

an imager configured to capture image data in a field of view proximate to the vehicle, wherein the controller identifies a coupler position of a trailer in the image data, and wherein the controller calculates the travel path to the target position aligning a coupler of the vehicle with a hitch of the trailer.

7. The control system according to claim 1, wherein the instruction further instructs the remote device to remove the first viewing zone from a simulated scene demonstrating the travel zone of the vehicle and the at least one viewing zone in response to the object detected in the first viewing zone.

8. A method for enforcing a viewing zone for monitoring a semi- automated vehicle operation, the method comprising:

identifying a travel path of a vehicle, wherein the travel path includes a travel zone of the vehicle extending from a current position to a target position;

in response to the travel path, calculating the travel zone occupied by the vehicle traversing the travel path;

determining a first viewing zone and a second viewing zone based on the travel zone, wherein the first viewing zone and the second viewing zone are outside of the travel zone;

identifying an obstruction in the first viewing zone;

in response to the obstruction, instructing a user to enter the second viewing zone; and controlling a navigation routine of the vehicle along the travel path in response to a location of the user in the second viewing zone.

9. The method according to claim 8, wherein the location of the user is detected based on a position of a remote device identified via a communication module.

10. The method according to claim 9, further comprising:

in response to the location of the remote device outside the second viewing zone, generating an instruction to relocate the remote device in the viewing zone.

11. The method according to claim 10, wherein the instruction provides at least one of a direction and a distance to relocate the remote device in the viewing zone.

12. The method according to claim 9, further comprising:

in response to the location of the remote device outside the second viewing zone, controlling the vehicle to suspend a maneuvering routine along the travel path.

13. A system for assisting in aligning a vehicle for hitching with a trailer comprising:

a vehicle maneuvering system that controls a velocity and a steering angle of the vehicle along a travel path;

a communication module configured to communicate with a remote device comprising a user interface, wherein the communication module identifies a position of the remote device and infers a location of a user;

an imaging system that captures and processes image data in a field of view; and a controller that:

identifies a coupler position of a trailer in the image data;

calculates the travel path extending from a current position to a target position of the vehicle, wherein the target position aligns a coupler of the vehicle with a hitch of a trailer;

based on the travel path, calculates a travel zone occupied by the vehicle traversing the travel path;

determines at least one viewing zone outside of and adjacent to opposing sides of the travel zone, wherein the at least one viewing zone comprises a first viewing zone and a second viewing zone, the first viewing zone on a first side portion of the vehicle along the travel path and the second viewing zone located on a second side portion of the vehicle along the travel path;

identifies an obstructed region in the first viewing zone, wherein the obstructed region is identified in response to an object in the first viewing zone;

in response to the detection of the object, outputs an instruction to position the user in the second viewing zone; and controls a navigation routine of the vehicle maneuvering system along the travel path in response to the position of the user relative to the second viewing zone.

14. The system according to claim 13, wherein the controller further:

in response to the position of the user outside the second viewing zone, controls the vehicle maneuvering system to suspend the navigation routine of the vehicle along the travel path.

* * * * *